United States Patent
Minamisako et al.

(10) Patent No.: US 9,500,376 B2
(45) Date of Patent: Nov. 22, 2016

(54) FLUID HEATING SYSTEM, FLUID HEATING METHOD, FLUID HEATING CONTROL SYSTEM, CONTROL APPARATUS, AND CONTROL METHOD

(75) Inventors: Hirokazu Minamisako, Tokyo (JP); Shinichi Uchino, Tokyo (JP); Kengo Takahashi, Tokyo (JP); Ryo Oya, Tokyo (JP); Kazuki Okada, Tokyo (JP); Takahiro Ushijima, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 1019 days.

(21) Appl. No.: 13/255,689

(22) PCT Filed: Mar. 30, 2009

(86) PCT No.: PCT/JP2009/056514
§ 371 (c)(1),
(2), (4) Date: Sep. 9, 2011

(87) PCT Pub. No.: WO2010/116454
PCT Pub. Date: Oct. 14, 2010

(65) Prior Publication Data
US 2011/0315093 A1 Dec. 29, 2011

(51) Int. Cl.
*F24H 8/00* (2006.01)
*F24D 11/02* (2006.01)
(Continued)

(52) U.S. Cl.
CPC ........... *F24D 11/0214* (2013.01); *F24D 17/02* (2013.01); *F24D 19/1072* (2013.01);
(Continued)

(58) Field of Classification Search
CPC ............... F24D 11/0214; F24D 17/02; F24D 19/1072; F24D 2200/12; F24D 2200/32; F24H 1/00; F25B 30/02

USPC ........................................................ 237/2 B
See application file for complete search history.

(56) References Cited

U.S. PATENT DOCUMENTS

2003/0178498 A1* 9/2003 Saitoh et al. ................. 237/2 B
2005/0111991 A1* 5/2005 Chida et al. .................. 417/207
(Continued)

FOREIGN PATENT DOCUMENTS

DE 3517902 A1 10/1986
JP 60-243450 A 12/1985
(Continued)

OTHER PUBLICATIONS

*International Search Report (PCT/ISA/210) issued on Jun. 23, 2009, by Japanese Patent Office as the International Searching Authority for International Application No. PCT/JP2009/056514.
(Continued)

*Primary Examiner* — Steven B McAllister
*Assistant Examiner* — Ko-Wei Lin
(74) *Attorney, Agent, or Firm* — Buchanan Ingersoll & Rooney PC

(57) ABSTRACT

When using a plurality of heaters such as heat pump units, capacity is properly distributed according to the required capacity, thereby enabling highly efficient operation of a hot water system. To achieve this, a control apparatus determines the heating capacity of each of the heat pump units in a way that the total heating capacity of the heat pump units reaches the heating capacity required in the hot water system as a whole, and further in a way that the total COP (coefficient of performance) of the heat pump units satisfies predetermined condition. The control apparatus controls each of regulating valves in a way that the heating capacity of each of the heat pump units reaches the above determined heating capacity.

10 Claims, 5 Drawing Sheets

(51) Int. Cl.
  *F24D 17/02* (2006.01)
  *F24D 19/10* (2006.01)
(52) U.S. Cl.
  CPC ....... *F24D2200/12* (2013.01); *F24D 2200/32* (2013.01); *Y02B 30/126* (2013.01); *Y10T 137/7737* (2015.04)

(56) References Cited

U.S. PATENT DOCUMENTS

| | | | |
|---|---|---|---|
| 2005/0189431 A1* | 9/2005 | Nakayama et al. | ............ 237/12 |
| 2007/0205298 A1 | 9/2007 | Harrison et al. | |
| 2009/0223509 A1* | 9/2009 | Hoellenriegel et al. | ...... 126/643 |

FOREIGN PATENT DOCUMENTS

| | | | | |
|---|---|---|---|---|
| JP | 2003-166750 A | | 6/2003 | |
| JP | 2004-340533 A | | 12/2004 | |
| JP | 2004-360970 A | | 12/2004 | |
| JP | 2004340533 A | * | 12/2004 | ............. F25B 30/02 |
| JP | 2005-090815 A | | 4/2005 | |
| JP | 2005-134062 A | | 5/2005 | |
| JP | 2005-214436 A | | 8/2005 | |
| JP | 2005-337626 A | | 12/2005 | |
| JP | 2005337626 A | * | 12/2005 | ............... F24H 1/00 |
| JP | 2006138493 A | * | 6/2006 | |
| JP | 2006-292281 A | | 10/2006 | |
| JP | 2007-192432 A | | 8/2007 | |
| JP | 2007-303755 A | | 11/2007 | |
| JP | 2007-322084 A | | 12/2007 | |

OTHER PUBLICATIONS

The extended European Search Report issued on Oct. 1, 2015, by the European Patent Office in corresponding European Application No. 09842964.0. (8 pages).

\* cited by examiner

Fig. 3

| UNIT TO BE OPERATED \ REQUIRED CAPACITY | 1Q | 2Q | 3Q | 4Q | 5Q | 6Q | 7Q | 8Q | 9Q | 10Q | 11Q | 12Q | 13Q | 14Q | 15Q |
|---|---|---|---|---|---|---|---|---|---|---|---|---|---|---|---|
| 1Q | ON | OFF | ON | OFF | ON | OFF | ON | OFF | ON | OFF | ON | OFF | ON | OFF | ON |
| 2Q | OFF | ON | ON | OFF | OFF | ON | ON | OFF | OFF | ON | ON | OFF | OFF | ON | ON |
| 4Q | OFF | OFF | OFF | ON | ON | ON | ON | OFF | OFF | OFF | OFF | ON | ON | ON | ON |
| 8Q | OFF | OFF | OFF | OFF | OFF | OFF | OFF | ON | ON | ON | ON | ON | ON | ON | ON |

Fig. 5

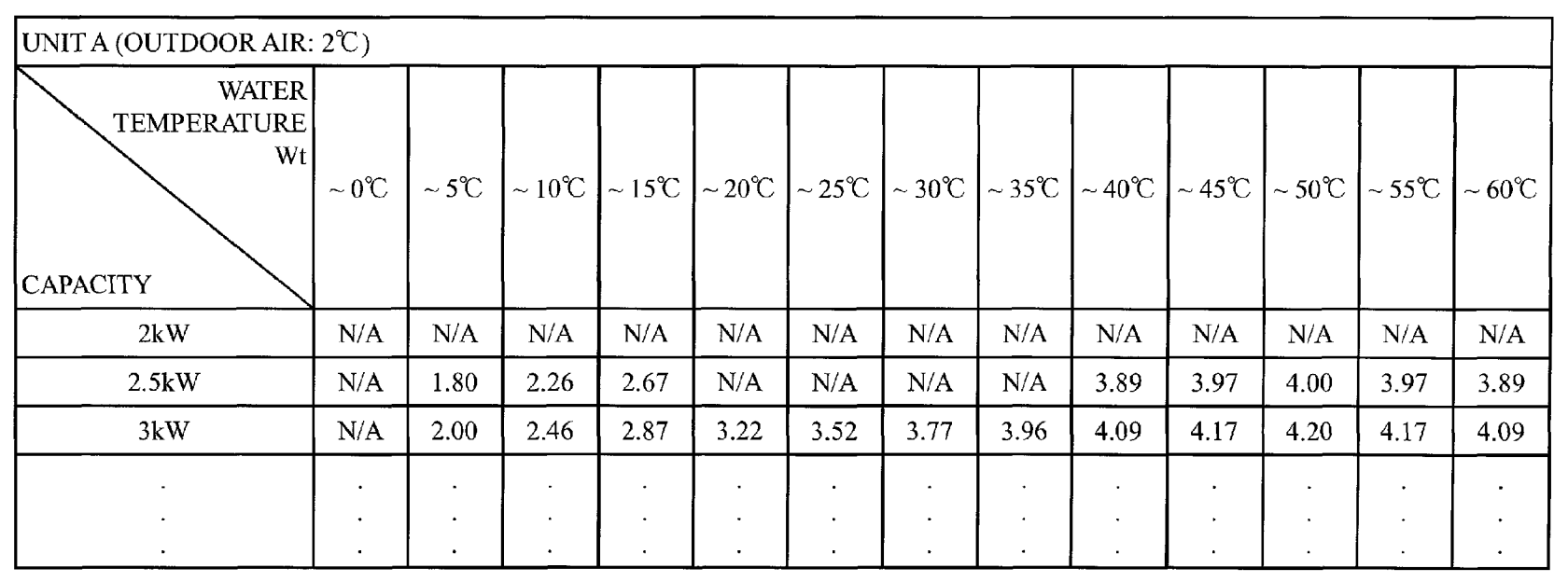

| UNIT A (OUTDOOR AIR: 2°C) | | | | | | | | | | | | | |
|---|---|---|---|---|---|---|---|---|---|---|---|---|---|
| WATER TEMPERATURE Wt / CAPACITY | ~0°C | ~5°C | ~10°C | ~15°C | ~20°C | ~25°C | ~30°C | ~35°C | ~40°C | ~45°C | ~50°C | ~55°C | ~60°C |
| 2kW | N/A | N/A | N/A | N/A | N/A | N/A | N/A | N/A | N/A | N/A | N/A | N/A | N/A |
| 2.5kW | N/A | 1.80 | 2.26 | 2.67 | 3.22 | 3.52 | 3.77 | N/A | 3.89 | 3.97 | 4.00 | 3.97 | 3.89 |
| 3kW | N/A | 2.00 | 2.46 | 2.87 | 3.22 | N/A | N/A | 3.96 | 4.09 | 4.17 | 4.20 | 4.17 | 4.09 |
| . . . | . . . | . . . | . . . | . . . | . . . | . . . | . . . | . . . | . . . | . . . | . . . | . . . | . . . |

FLUID HEATING SYSTEM, FLUID HEATING METHOD, FLUID HEATING CONTROL SYSTEM, CONTROL APPARATUS, AND CONTROL METHOD

TECHNICAL FIELD

The present invention relates to a fluid heating system, a fluid heating method, a fluid heating control system, a control apparatus, and a control method. The present invention relates to, in particular, control of highly efficient operation of a heat pump unit.

BACKGROUND ART

Conventionally, a hot water system has been used, in which water is heated by a heat pump unit and the hot water is stored in a tank.

The hot water system using a plurality of heat pump units has been proposed (refer to Patent Literature 1, for example). In the conventional hot water system, the number of heat pump units to be operated is determined according to the hot water supply load. The order of priority to start operation is specified for each heat pump unit. The order of priority is changed at every predetermined time period.

Patent Literature 1: JP2005-134062A

DISCLOSURE OF INVENTION

Technical Problem

In each heat pump unit, a compressor and a heat exchanger, which are function elements of the heat pump cycle, have a capacity band where they operate the most efficiently. When a heat pump unit is operated, deviating from the capacity band, a COP (coefficient of performance) may be decreased largely. In the conventional hot water system, since the order of priority was specified regardless of the capacity band where each heat pump unit can operate the most efficiently, it was impossible to obtain a sufficient COP.

For each heat pump unit, the minimum operating capacity is prescribed. It is, in principle, impossible to operate the heat pump units with the capacity being less than the minimum operating capacity. Therefore, if capacity equal to or less than a certain level is required, the heat pump units must be stopped, and restarted when capacity exceeding the minimum operating capacity is required. In the conventional hot water system, the order of priority was specified regardless of the minimum operating capacity of each heat pump unit, and thus it was impossible to use the heat pump units having low minimum operating capacity.

In the present invention, for example, when using a plurality of heaters such as heat pump units, capacity is properly distributed according to the required capacity, thereby enabling highly efficient operation of a fluid heating system such as a hot water system. Further, in the present invention, for example, when using a plurality of heaters such as heat pump units, a heat pump unit having low minimum operating capacity is also used according to the required capacity, thereby enabling a flexible configuration of a fluid heating system such as a hot water system.

Solution to Problem

A fluid heating system related to one aspect of the present invention includes a plurality of heaters configured to heat fluid, the plurality of heaters having a property that heating capacity varies according to flow quantity of the fluid and a COP (coefficient of performance) varies according to the heating capacity;

a facility including at least either one of a tank configured to store the fluid and an appliance configured to use the fluid as heat source;

a fluid circuit configured to circulate the fluid between the plurality of heaters and the facility;

a plurality of regulating valves configured to regulate the flow quantity of the fluid for each of the plurality of heaters; and a control apparatus configured to determine the heating capacity of each of the plurality of heaters in a way that total heating capacity of the plurality of heaters reaches heating capacity required by the facility, and further in a way that a total COP of the plurality of heaters satisfies a predetermined condition, and to control each of the plurality of regulating valves in a way that the heating capacity of each of the plurality of heaters reaches the determined heating capacity.

The control apparatus determines the heating capacity of each of the plurality of heaters in a way that the total heating capacity of the plurality of heaters reaches the heating capacity required by the facility, and further in a way that the total COP of the plurality of heaters reaches maximum.

The plurality of heaters include two or more heaters having different properties.

The plurality of heaters include two or more heaters having different minimum heat capacities.

The plurality of heaters include two or more heat pump units using different kinds of refrigerant.

The plurality of heaters include a heat pump unit and a heater other than the heat pump unit.

The fluid heating system further includes a power meter configured to measure power consumption of each of the plurality of heaters; and an outdoor air temperature sensor configured to measure an outdoor air temperature.

The control apparatus, based on the determined heating capacity, the power consumption measured by the power meter, and the outdoor air temperature measured by the outdoor air temperature sensor, obtains relation between the COP and the heating capacity of each of the plurality of heaters according to the outdoor air temperature, and determines the heating capacity of each of the plurality of heaters by referring to the obtained relation.

The control apparatus previously defines the heating capacity by which the COP of each of the plurality of heaters reaches maximum as optimal capacity, selects a group of heaters composed of at least one heater out of the plurality of heaters, total optimal capacity of the at least one heater corresponding to the heating capacity required by the facility, and controls each of the plurality of regulating valves in a way that total heating capacity of the at least one heater composing the selected group of heaters reaches the heating capacity required by the facility.

The control apparatus previously defines the heating capacity by which the COP of each of the plurality of heaters reaches maximum as optimal capacity, and selects heaters out of the plurality of heaters sequentially from a heater of which the optimal capacity is equal to or less than the heating capacity required by the facility and also of which the optimal capacity is closest to the heating capacity required by the facility, and controls each of the plurality of regulating valves in a way that total heating capacity of the selected heaters reaches the heating capacity required by the facility.

A fluid heating method related to one aspect of the present invention includes a step of circulating fluid between a plurality of heaters heating the fluid, the plurality of heaters having a property that heating capacity varies according to flow quantity of the fluid and a COP (coefficient of performance) varies according to the heating capacity, and a facility including at least either one of a tank storing the fluid and an appliance using the fluid as heat source;

a step of regulating the flow quantity of the fluid for each of the plurality of heaters; and a step of determining the heating capacity of each of the plurality of heaters in a way that total heating capacity of the plurality of heaters reaches heating capacity required by the facility, and further in a way that a total COP of the plurality of heaters satisfies a predetermined condition, and of controlling each of the plurality of regulating valves in a way that the heating capacity of each of the plurality of heaters reaches the determined heating capacity.

A fluid heating control system related to one aspect of the present invention includes a fluid circuit configured to circulate fluid between a plurality of heaters heating the fluid, the plurality of heaters having a property that heating capacity varies according to flow quantity of the fluid and a COP (coefficient of performance) varies according to the heating capacity, and a facility including at least either one of a tank storing the fluid and an appliance using the fluid as heat source;

a plurality of regulating valves configured to regulate the flow quantity of the fluid for each of the plurality of heaters; and a control apparatus configured to determine the heating capacity of each of the plurality of heaters in a way that total heating capacity of the plurality of heaters reaches heating capacity required by the facility, and further in a way that a total COP of the plurality of heaters satisfies a predetermined condition, and to control each of the plurality of regulating valves in a way that the heating capacity of each of the plurality of heaters reaches the determined heating capacity.

A control apparatus related to one aspect of the present invention is connected to a plurality of regulating valves attached to a fluid circuit which circulates fluid between a plurality of heaters heating the fluid, the plurality of heaters having a property that heating capacity varies according to flow quantity of the fluid and a COP (coefficient of performance) varies according to the heating capacity, and a facility including at least either one of a tank storing the fluid and an appliance using the fluid as heat source.

The control apparatus includes a determining part configured to determine the heating capacity of each of the plurality of heaters in a way that total heating capacity of the plurality of heaters reaches heating capacity required by the facility, and further in a way that a total COP of the plurality of heaters satisfies a predetermined condition; and a controlling part configured to control each of the plurality of regulating valves in a way that the heating capacity of each of the plurality of heaters reaches the determined heating capacity.

A control method related to one aspect of the present invention includes a step of, by a control apparatus connected to a plurality of regulating valves attached to a fluid circuit which circulates fluid between a plurality of heaters heating the fluid, the plurality of heaters having a property that heating capacity varies according to flow quantity of the fluid and a COP (coefficient of performance) varies according to the heating capacity, and a facility including at least either one of a tank storing the fluid and an appliance using the fluid as heat source, determining the heating capacity of each of the plurality of heaters in a way that total heating capacity of the plurality of heaters reaches heating capacity required by the facility, and further in a way that a total COP of the plurality of heaters satisfies a predetermined condition; and a step of controlling each of the plurality of regulating valves in a way that the heating capacity of each of the plurality of heaters reaches the determined heating capacity.

Advantageous Effects of Invention

According to one aspect of the present invention, a control apparatus determines heating capacity of each of a plurality of heaters in a way that total heating capacity of the plurality of heaters reaches required heating capacity, and further in a way that a total COP of the plurality of heaters satisfies a predetermined condition. The control apparatus controls each of a plurality of regulating valves in a way that the heating capacity of each of the plurality of heaters reaches the determined heating capacity. Therefore, the highly efficient operation of a fluid heating system such as a hot water system is possible.

DESCRIPTION OF PREFERRED EMBODIMENTS

Hereinafter, embodiments of the present invention will be explained with reference to the figures.

Embodiment 1

FIG. 1 is a configuration diagram of a hot water system 10 related to the present embodiment.

In FIG. 1, the hot water system 10 includes a fluid circuit 10a in which water circulates and three heat pump cycles 10b in which refrigerant (e.g., R410A) circulates. The hot water system 10 is an example of a fluid heating system. Water is an example of fluid.

The water circulation circuit side (i.e., a fluid circuit 10a) is composed mainly of a hot-water storage tank (i.e., a tank 11), a water circulating pump (i.e., a pump 12), and three water quantity regulating valves (i.e., regulating valves 13a, 13b, 13c). Three units (i.e., heat pump units 14a, 14b, and 14c) are connected in parallel to the fluid circuit 10a. The heat pump units 14a, 14b, and 14c are an example of a plurality of heaters for heating the fluid. In the upper part of the tank 11, heated water to be supplied to sanitary facilities (e.g., a shower) is stored, and in the lower part of the tank 11, unheated water which is returned from the sanitary facilities is stored. The pump 12 supplies the unheated water to the heat pump units 14a, 14b, and 14c. The regulating valves 13a, 13b, and 13c control the flow quantity of the water for the heat pump units 14a, 14b, and 14c, respectively. The heating capacity of each of the heat pump units 14a, 14b, and 14c vary according to the flow quantity of the water. The heat pump units 14a, 14b, and 14c have a property that a COP (coefficient of performance, or coefficient of capacity/power consumption) varies according to the heating capacity. The property is different for each unit. The water supplied to the heat pump units 14a, 14b, and 14c by the pump 12 is heated by the heat pump units 14a, 14b, and 14c, and then joins together and flows back to the tank 11.

The heating circuit side (i.e., the heat pump cycles 10b) is provided inside each unit. Each heat pump cycle 10b is composed mainly of an expansion valve 15, a compressor 16, an air heat exchanger 17, and a water heat exchanger 18. The compressor 16 compresses and heats the refrigerant. The water heat exchanger 18 heats the water flowing through the fluid circuit 10a using the refrigerant heated by the compressor 16. The expansion valve 15 cools the refrigerant by expansion cooling. The air heat exchanger 17, after the refrigerant is cooled by the expansion valve 15, collects heat from the outdoor air into the refrigerant.

To the tank 11, the pump 12, each water quantity regulating valve, and each unit, a system control part (i.e., a control apparatus 19) for controlling their operations and detecting their states is connected. The control apparatus 19 includes a detecting part 19a, a determining part 19b, and a controlling part 19c. The detecting part 19a measures temperature of the water stored in the upper and lower parts of the tank 11 using a thermometer 20. The determining part 19b compares the temperature of the water measured by the detecting part 19a with temperature required by a user through an operation panel, etc. (not shown), and calculates the heating capacity which is necessary for the hot water system 10 as a whole (i.e., the heating capacity required by the tank 11). The determining part 19b determines the heating capacity of each unit in such a way that the total heating capacity of the heat pump units 14a, 14b, and 14c reaches the necessary heating capacity, and further, in such a way that the total COP of the heat pump units 14a, 14b, and 14c satisfies predetermined condition. The controlling part 19c controls each water quantity regulating valve in such a way that the heating capacity of each unit reaches the heating capacity determined by the determining part 19b.

In the present embodiment, the above condition is defined as the total COP of all the units reaching the maximum. Therefore, if there are several setting patterns of the heating capacity of each unit, by the setting patterns the total heating capacity of all the units becoming the necessary heating capacity, the determining part 19b selects, out of the setting patterns, a setting pattern by which the total COP of all the units becomes the maximum. As a modified example of the present embodiment, another definition can be given to the above condition. For example, the above condition can be defined as the total COP of all the units being within a predetermined range. For example, the above condition can be defined as the total COP of all the units being greater than a predetermined threshold value. In either case, the above condition is defined in such a way that the total COP of all the units is at least greater than the minimum value of the total COP of all the units. In the conventional hot water system, since the order of priority was specified regardless of the capacity band where each unit can operate the most efficiently, there was a possibility that the total COP of all the units might be the minimum value. On the contrary, in the present embodiment, such possibility can be eliminated by setting the above condition, and thus the highly efficient operation of the hot water system 10 is guaranteed.

In the present embodiment, three heat pump cycles 10b are connected in parallel to the fluid circuit 10a. Namely, three units having the heat pump cycles 10b are connected in parallel. As a modified example of the present embodiment, two, or more than three units can be connected in parallel. As another modified example, among a plurality of units, some can be connected in series. As another modified example, among a plurality of units, some can be heaters (e.g., boilers) that heat water by means other than the heat pump cycles 10b. As another modified example, all units can be heaters that heat water by means other than the heat pump cycles 10b.

In the present embodiment, the heat pump units 14a, 14b, and 14c have properties which are different with each other. As a modified example of the present embodiment, among the heat pump units 14a, 14b, and 14c, two units can have the same property. As another modified example, all the units can have the same property.

In the present embodiment, the heat pump units 14a, 14b, and 14c include the heat pump cycles 10b using the same kind of refrigerant (e.g., R410A). As a modified example of the present embodiment, among the heat pump units 14a, 14b, and 14c, at least two units can include the heat pump cycles 10b using refrigerant which is different with each other (e.g., R410A and CO2).

In the present embodiment, the heat pump units 14a, 14b, and 14c include the heat pump cycles 10b using the same kind of refrigerant (e.g., R410A). As a modified example of the present embodiment, among the heat pump units 14a, 14b, and 14c, at least two units can include the heat pump cycles 10b using refrigerant which is different with each other (e.g., R410A and CO2).

The hot water system 10 can include, instead of the tank 11, or together with the tank 11, a floor heating appliance, a radiator, or the like. The floor heating appliance and the radiator are examples of an appliance using the fluid as heat source. The tank 11 and the appliance such as the floor heating appliance or the radiator are examples of a facility. In the present embodiment, the fluid circuit 10a circulates the water between each unit and the facility; however, when the facility is the floor heating, the radiator, or the like, the fluid circuit 10a can circulate fluid other than the water between each unit and facilities.

Next, the operation of the hot water system 10 will be explained.

In the control apparatus 19, the detecting part 19a obtains water temperature in the tank 11 measured by the thermometer 20.

In the control apparatus 19, the determining part 19b determines the capacity to be achieved of the hot water system 10 as a whole based on the water temperature obtained by the detecting part 19a and requirement of the user. If the difference between the water temperature in the tank 11 and the temperature set by the user side is small, the required capacity is small. However, on the contrary, if the temperature difference is large and it is necessary to heat in a short time, large capacity is required. Even if the temperature difference is small, when the quantity of hot water in use transiently increases, the water temperature of the tank 11 suddenly decreases. Thus, it is necessary to prevent the decrease of the temperature by the large capacity. The determining part 19b, with overall judgment of the above, calculates an ideal increasing speed of the temperature in the tank 11 and determines the necessary capacity per hour. For example, the determining part 19b calculates necessary capacity per hour from the temperature and the time set by the user (e.g., when the user can set a "rapid" mode), and the inlet temperature and the outlet temperature of the tank 11. When there exists a facility other than the tank 11 (e.g., the appliance such as the floor heating appliance or the radiator), the determining part 19b calculates the necessary capacity per hour with considering also the heat discharge amount in the facility. The determining part 19b selects a unit to be used with respect to the determined capacity out of the heat pump units 14a, 14b, and 14c, and determines the capacity to be assigned to the respective units.

FIG. 2 is a graph showing an example of the relation between the capacity and the COP of the units in the present embodiment.

In the example of FIG. 2, the heat pump units 14a, 14b, and 14c are shown as "the unit A", "the unit B", and "the unit C", respectively. The horizontal axis of the graph shows the size of the capacity. The vertical axis of the graph shows the size of the COP. In the example of FIG. 2, when the heat pump unit 14a exercises the capacity of Q which is an arbitrary value of the capacity, the COP of the heat pump unit 14a becomes the maximum. If the heat pump unit 14b exercises the capacity of 2Q which is twice of Q, the COP of the heat pump unit 14b becomes the maximum. If the heat pump unit 14c exercises the capacity of 4Q which is four times of Q, the COP of the heat pump unit 14c becomes the maximum.

The determining part 19b, at the time of determining the capacity of each unit, uses the COP values corresponding to the capacity values previously stored in a storage medium as shown in FIG. 2. Namely, the determining part 19b determines a combination of units to be used and individual capacity of each unit in such a way that the capacity to be achieved can be obtained by adding the capacity exercised by each unit, and further in such a way that the hot water system 10 can operate the most efficiently as a whole.

FIG. 3 is a table showing a selection example of units to be operated in the present embodiment.

In the example of FIG. 3, like the example of FIG. 2, it is assumed that there exist a plurality of units whose COP reaches the peak when the capacity is a power of 2. Specifically, in the hot water system 10, it is assumed that there exists, other than the heat pump units 14a, 14b, and 14c, one more unit, and the capacity of the respective units by which the COP reaches the peak is 1Q, 2Q, 4Q, and 8Q. In FIG. 3, the determining part 19b sequentially combines, with the unit whose capacity by which the COP reaches the peak is equal to or less than and is the closest to the required capacity (i.e., the heating capacity required by the tank 11, and/or the facility including an appliance such as the floor heating appliance or the radiator), a unit whose capacity by which the COP reaches the peak is equal to or less than and is the closest to the remaining required capacity, thereby determining a combination in which the respective units can exercise the optimal capacity. Even if units having various properties are combined instead of the units whose COP reaches the peak when the capacity is a power of 2, by grasping the capacity by which the COP reaches the peak for each unit, the determining part 19b can instantly calculate the capacity of each unit. Data showing a combination of the required capacity and the corresponding unit can be previously stored in the storage medium, and the determining part 19b can refer to the data when determining the capacity of each unit.

In the control apparatus 19, the controlling part 19c gives operation instruction to each unit in such a way that each unit operates with the capacity determined by the determining part 19b. Also, the controlling part 19c drains unheated water only to the unit to be operated using each water quantity regulating valve. The water heated by each unit joins together before the pump 12 and flows back to the tank 11.

The heating capacity by which the COP of each unit reaches the maximum can be previously defined as the optimal capacity. As described above, the determining part 19b selects a unit, out of the heat pump units 14a, 14b, and 14c, sequentially from the unit of which the optimal capacity is equal to or less than the required capacity and also of which the optimal capacity is the closest to the required capacity. The unit selected by the determining part 19b forms a group of heaters. There are seven kinds as the groups of heaters composed of at least one unit out of the heat pump units 14a, 14b, and 14c; among them, the group of heaters composed of the unit of which the total optimal capacity corresponds to the required capacity is selected by the determining part 19b. Namely, the total optimal capacity of the unit selected by the determining part 19b corresponds to the required capacity. Specifically, the total optimal capacity of the unit selected by the determining part 19b is equivalent or close to the required capacity. The controlling part 19c controls each water quantity regulating valve in a way that the total heating capacity of the unit composing the group of heaters selected by the determining part 19b becomes the required capacity. When the total optimal capacity of the unit composing the selected group of heaters is equivalent to the required capacity, the controlling part 19c controls each water quantity regulating valve in a way that the heating capacity of the unit becomes the optimal capacity. On the other hand, when the total optimal capacity of the unit composing the group of heaters selected by the determining part 19b is not equivalent to the heating capacity required by the tank 11, the controlling part 19c regulates, for example, the heating capacity of one unit in a way that the total heating capacity of the unit composing the group of heaters selected by the determining part 19b becomes the heating capacity required by the tank 11. In this manner, according to the present embodiment, proper distribution of the capacity is done according to the required capacity. Therefore, the highly efficient operation of the hot water system 10 is made possible.

In the present embodiment, out of the heat pump units 14a, 14b, and 14c, at least two units have the minimum heating capacity which is different with each other, and thus a unit having the low minimum operating capacity can be used according to the required capacity. Therefore, it is possible to flexibly configure the hot water system 10.

As explained above, in the present embodiment, by operating each unit with the optimal capacity, it is possible to increase the overall efficiency of the hot water system 10. Further, compared with a case in which a single unit is connected, small capacity units are installed, thereby the operation can be done even when the required capacity is small. Therefore, the highly efficient operation is made possible.

As described above, according to the present embodiment, when using the hot water system 10 including a plurality of units having the heat pump cycles, the highly efficient operation of the hot water system 10 can be made by selection of the units to be operated and distribution of the capacity of the units. The present embodiment can be applied widely with respect to the required capacity. Specifically, the unit to be used is properly selected according to the capacity band of each unit, and thus it is possible to continually maintain the highly efficient operation with respect to the wide variety of the required capacity. Further, according to the present embodiment, the efficient operation can be made at the time of the capacity being low and the operation being difficult by a single large capacity unit.

The water circulating hot water system (i.e., the hot water system 10) related to the present embodiment includes the pluralarity of heat pump units 14a, 14b, and 14c, the hot-water storage tank (i.e., the tank 11), the water circuit (i.e., the fluid circuit 10a), the pump 12, and the control apparatus 19. In the fluid circuit 10a, the heat pump units 14a, 14b, and 14c are connected to the tank 11 in parallel, and the valves which can regulate the fluid quantity (i.e., the regulating valves 13a, 13b, and 13c) are provided for the respective units. The pump 12 circulates the water. The control apparatus 19 is connected to the heat pump units 14a, 14b, and 14c and the pump 12, thereby managing the output from each of them.

The hot water system 10 includes means (i.e., the control apparatus 19) to grasp the coefficient of capacity/power consumption of the respective heat pump units 14a, 14b, and 14c, which are connected in parallel to the fluid circuit 10a, beforehand. The control apparatus 19 controls the respective heat pump unit 14a, 14b, and 14c in a way that the coefficient of capacity/power consumption becomes the maximum with respect to the required capacity of the overall system.

The hot water system 10 connects the heat pump units 14a, 14b, and 14c having different minimum operating capacity and different capacity at the time of the coefficient of capacity/power consumption being the maximum, and controls the respective heat pump units 14a, 14b, and 14c so that they operate efficiently in the wide capacity band.

The hot water system 10 includes the hot-water storage tank (i.e., the tank 11), the water circuit (i.e., the fluid circuit 10a), the pluralarity of heat pump units 14a, 14b, and 14c, and the mechanism (i.e., the control apparatus 19) to control the operation of these units. When reduction of the hot water in the tank 11, decrease of the temperature of the water, or the like occurs, the fluid circuit 10a takes out the unheated water from the tank 11, heats the water and then returns the water to the tank 11. The heat pump units 14a, 14b, and 14c are used for heating the unheated water. The control apparatus 19 controls the operation of the heat pump units 14a, 14b, and 14c having different capacity bands in which the units can operate the most efficiently. The control apparatus 19 operates an unit appropriate for the required capacity, thereby improving the COP of the overall system.

Embodiment 2

Concerning to the present embodiment, the difference from the first embodiment will be mainly explained.

In the first embodiment, the control apparatus 19 grasps the relation between the capacity and the COP of each unit beforehand, and determines the optimal combination of the units according to the required capacity. In contrast, in the present embodiment, the control apparatus 19 measures the capacity and the COP of each unit, obtains the relation between the capacity and the COP of each unit, and dynamically determines the optimal combination of the units according to the required capacity. Therefore, according to the present embodiment, it is possible to prevent the decrease of performance when failure occurs and to improve the performance when the units are enhanced.

FIG. 4 is a configuration diagram of a hot water system 10 related to the present embodiment.

In FIG. 4, the hot water system 10 is provided with a thermometer 21, a flow sensor 22, a power meter 23, and an outdoor air temperature sensor 24. The thermometer 21 is attached to an outlet to the fluid circuit 10a of each unit and measures the water temperature. The flow sensor 22 is attached to each water quantity regulating valve and measures the flow quantity of water flowing into each unit. The power meter 23 is attached to each unit and measures the power consumption of each unit. The outdoor air temperature sensor 24 measures the outdoor air temperature.

In the control apparatus 19, the determining part 19b calculates the capacity and the COP of each unit based on data collected by the detecting part 19a from the thermometer 21, the flow sensor 22, and the power meter 23. Further, the determining part 19b stores the measured values of the outdoor air temperature sensor 24 obtained by the detecting part 19a in the storage medium to record the outdoor air temperature at the time of calculating the capacity and the COP of each unit.

The COPs of the heat pump units 14a, 14b, and 14c, in principle, depend on the outdoor air temperature, the output hot water temperature, and the capacity, and hardly vary according to other factors. Therefore, the determining part 19b stores, in the storage medium, the data which has been collected once by the detecting part 19a in a form of a database having, as keys, the outdoor air temperature, the output hot water temperature, and the capacity at the time of the data being collected. The determining part 19b, by referring to this database, selects a unit to be operated similarly to the first embodiment.

FIG. 5 is a table showing a calculation example of a COP of a unit in the present embodiment.

The example of FIG. 5 shows the COP corresponding to the capacity and the output hot water temperature of "unit A" when the outdoor air temperature is 2 degrees Celsius. The determining part 19b enhances the database by repeating the calculation of the COP of each unit, thereby enabling more precise control. If a combination of a certain capacity and a certain output hot water temperature of a certain unit at a certain outdoor air temperature is a condition that has not been measured, the determining part 19b calculates a predicted COP based on the data with a close condition.

As described above, after determining the heating capacity of each unit, the determining part 19b obtains the relation between the COP and the heating capacity of each unit according to the outdoor air temperature, based on the determined heating capacity, the power consumption measured by the power meter 23, and the outdoor air temperature measured by the outdoor air temperature sensor 24. The determining part 19b determines the heating capacity of each unit by referring to the relation which has been obtained at the previous time when subsequently determining the heating capacity of each unit.

As explained above, in the present embodiment, the COP of each unit is calculated and stored, and the unit to be operated is determined by predicting the COP for the next operation. Thus, a unit having an unknown COP can be also controlled. By conducting the above control, as long as the heaters are those driven by electricity such as a heat pump using different kinds of refrigerant, an electric heater boiler, a solar water heater, it is possible to calculate the COP of each heater and determine a combination of heaters which enables the most efficient operation. Further, since the capacity and the COP of each unit are observed, it is possible to detect a failure of a unit.

The water circulating hot water system (i.e., the hot water system 10) related to the present embodiment includes means (i.e., the thermometer 21) to grasp the outlet water temperature of each of the heat pump units 14a, 14b, and 14c and means (i.e., the power meter 23) to grasp the power consumption of each of the heat pump units 14a, 14b, and 14c. The hot water system 10, by dynamically judging the operation status of each of the heat pump units 14a, 14b, and 14c, controls each of the heat pump units 14a, 14b, and 14c in a way that the coefficient of capacity/power consumption becomes the maximum with respect to the required capacity of the overall system.

As explained above, in the present embodiment, the plurality of heat pump units 14a, 14b, and 14c are connected in parallel. The capacity of each unit can be separately controlled. The control apparatus 19 operates each unit efficiently, considering the capacity to be achieved in the overall system. To achieve this, the control apparatus 19 judges the required capacity, measures the current ambient environment, and, from these kinds of information, grasps or predicts beforehand the COP of each unit when it operates. The control apparatus 19 selects a unit in a way that the power consumption of the unit becomes the minimum with respect to the required capacity, and controls the capacity of the unit, thereby suppressing the power consumption of the overall system.

As described above, according to the present embodiment, it is possible to efficiently operate the hot water system 10 even if the equipment become faulty, or a unit is added to increase the capacity (i.e., when the number of units is increased/decreased). Namely, in the system composed of multiple units, a system change such as increase of the number of units or temporary decrease of units due to failure is handled with less change to the existing system and with flexibility, thereby facilitating the maintenance.

Hereinbefore, embodiments of the present invention have been explained; among these, two or more embodiments can be combined and implemented. Or, among these, one embodiment can be partially implemented. Or, among these, two or more embodiments can be partially combined and implemented.

BRIEF DESCRIPTION OF DRAWINGS

FIG. 3 is a table showing a selection example of units to be operated in the first embodiment.

FIG. 5 is a table showing a calculation example of a COP of a unit in the second embodiment.

REFERENCE SIGNS LIST

Figure 1:
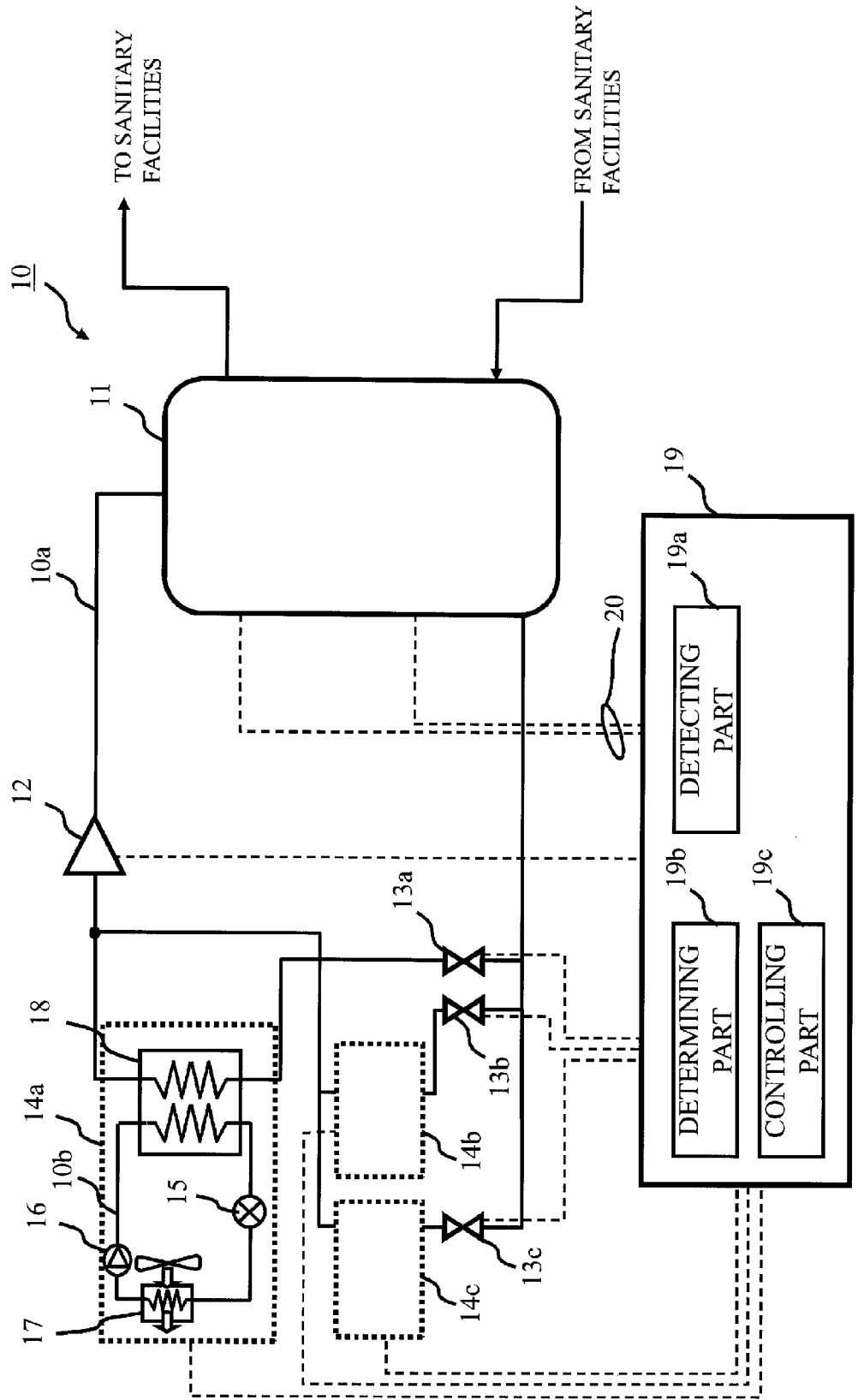
FIG. 1 is a configuration diagram of a hot water system related to the first embodiment.
Figure 2:
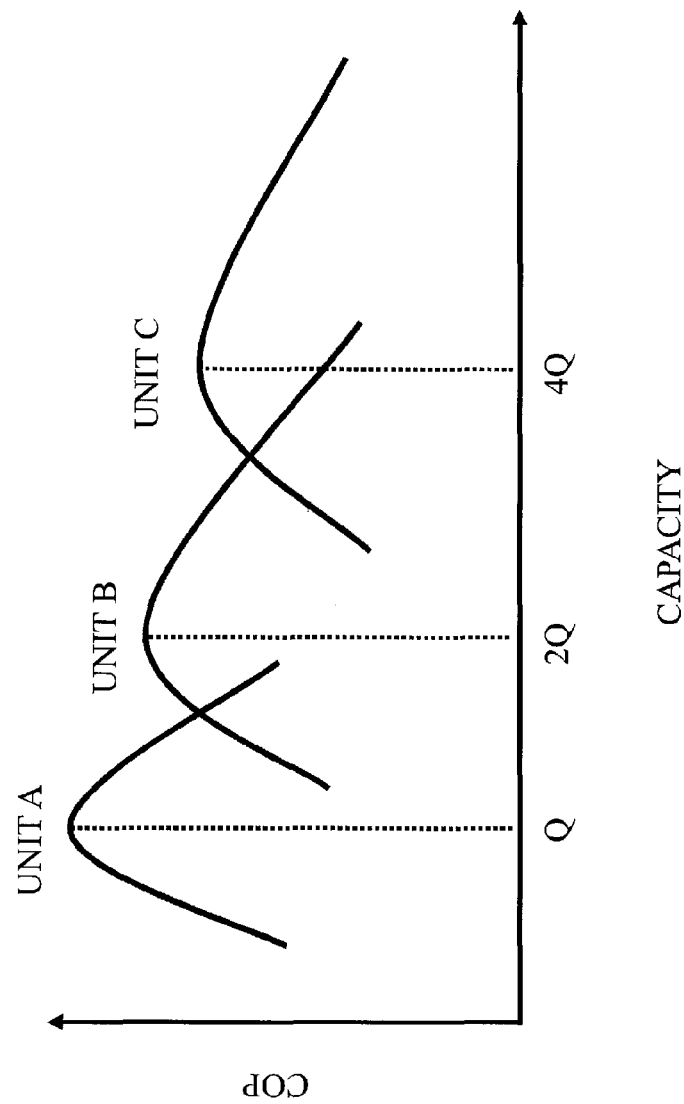
FIG. 2 is a graph showing an example of the relation between capacity and a COP of units in the first embodiment.
Figure 4:
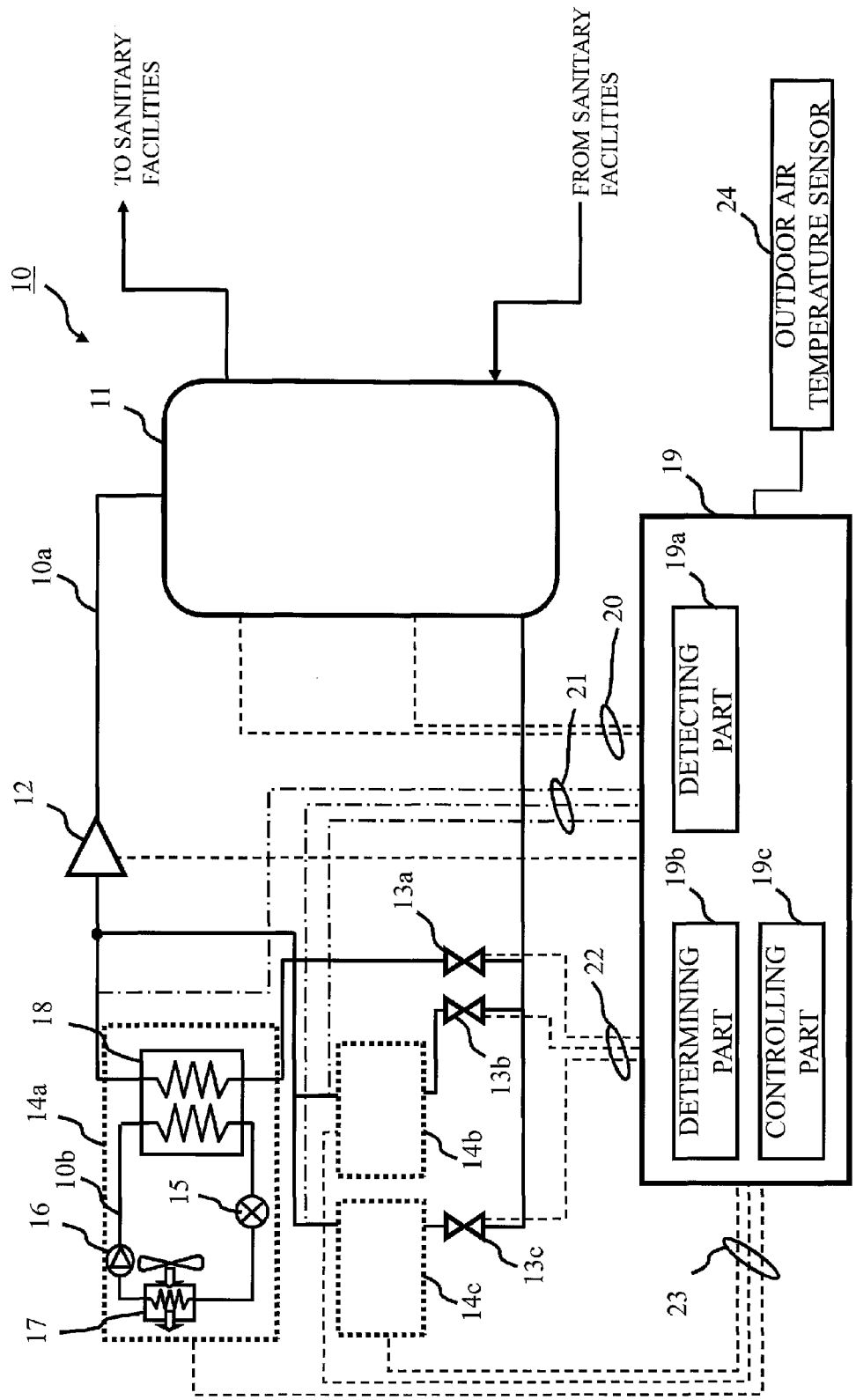
FIG. 4 is a configuration diagram of a hot water system related to the second embodiment.

10: a hot water system; 10a: a fluid circuit; 10b: a heat pump cycle; 11: a tank; 12: a pump; 13a, 13b, 13c: regulating valves; 14a, 14b, 14c: heat pump units; 15: an expansion valve; 16: a compressor; 17: an air heat exchanger; 18: a water heat exchanger; 19: a control apparatus; 19a: a detecting part; 19b: a determining part; 19c: a controlling part; 20: a thermometer; 21: a thermometer; 22: a flow sensor; 23: a power meter; and 24: an outdoor air temperature sensor.

The invention claimed is:

1. A fluid heating control system comprising:
a fluid circuit configured to circulate fluid between a plurality of heaters arranged in parallel and configured to heat the fluid, the plurality of heaters having a property that heating capacity varies according to flow quantity of the fluid and a COP (coefficient of performance) varies according to the heating capacity, and at least either one of a tank configured to store the fluid and an appliance configured to use the fluid as a heat source;
a power meter configured to measure power consumption of each of the plurality of heaters;
an outdoor air temperature sensor configured to measure an outdoor air temperature;
a plurality of regulating valves, each regulating valve configured to regulate the flow quantity of the fluid for a respective heater of the plurality of heaters; and
a control apparatus configured to determine the heating capacity of each of the plurality of heaters so that total heating capacity of the plurality of heaters reaches a required heating capacity, and so that a total COP of the plurality of heaters satisfies a predetermined condition, and to control each of the plurality of regulating valves so that the heating capacity of each of the plurality of heaters reaches the determined heating capacity,
wherein the control apparatus, based on the determined heating capacity, the power consumption measured by the power meter, and the outdoor air temperature measured by the outdoor air temperature sensor, obtains a relation between the COP and the heating capacity of each of the plurality of heaters according to the outdoor air temperature, and determines the heating capacity of each of the plurality of heaters by referring to the obtained relation.

2. The fluid heating control system of claim 1,
wherein the control apparatus determines the heating capacity of each of the plurality of heaters so that the total heating capacity of the plurality of heaters reaches the required heating capacity, and so in a way that the total COP of the plurality of heaters reaches maximum.

3. A fluid heating system comprising:
the fluid heating control system of claim 1; and
the plurality of heaters to be connected to the fluid heating control system,
wherein the plurality of heaters include two or more heaters having different properties.

4. A fluid heating system comprising:
the fluid heating control system of claim 1; and
the plurality of heaters to be connected to the fluid heating control system,
wherein the plurality of heaters include two or more heaters having different minimum heat capacities.

5. A fluid heating system comprising:
the fluid heating control system of claim 1; and
the plurality of heaters to be connected to the fluid heating control system,
wherein the plurality of heaters include two or more heat pump units using different kinds of refrigerant.

6. A fluid heating system comprising:
the fluid heating control system of claim 1; and
the plurality of heaters to be connected to the fluid heating control system,
wherein the plurality of heaters include a heat pump unit and a heater other than the heat pump unit.

7. The fluid heating control system of claim 1,
wherein the control apparatus defines the heating capacity by which the COP of each of the plurality of heaters reaches maximum as optimal capacity, selects at least one heater out of the plurality of heaters, a total optimal capacity of the at least one heater corresponding to the required heating capacity, and controls each of the plurality of regulating valves so that total heating capacity of the at least one heater reaches the required heating capacity.

8. The fluid heating control system of claim 1,
wherein the control apparatus defines the heating capacity by which the COP of each of the plurality of heaters reaches a maximum as optimal capacity, and selects at least one heater having the optimal capacity equal to or less than the required heating capacity, out of the plurality of heaters sequentially from a heater and having the optimal capacity closest to the required heating capacity, and controls each of the plurality of regulating valves so that total heating capacity of the selected heaters reaches the required heating capacity.

9. A fluid heating method comprising:
circulating fluid between a plurality of heaters heating the fluid, the plurality of heaters having a property that heating capacity varies according to flow quantity of the fluid and a COP (coefficient of performance) varies according to the heating capacity, and at least either one of a tank storing the fluid and an appliance using the fluid as a heat source;
measuring a power consumption of each of the plurality of heaters;
measuring an outdoor air temperature;
determining the heating capacity of each of the plurality of heaters so that total heating capacity of the plurality of heaters reaches a required heating capacity, and so that a total COP of the plurality of heaters satisfies a predetermined condition; and
controlling each of a plurality of regulating valves regulating the flow quantity of the fluid for each of the plurality of heaters so that the heating capacity of each of the plurality of heaters reaches the determined heating capacity,
wherein, based on the determined heating capacity, the measured power consumption, and the outdoor air temperature, a relation between the COP and the heating capacity of each of the plurality of heaters is obtained according to the outdoor air temperature, and the heating capacity of each of the plurality of heaters is determined by referring to the obtained relation.

10. A control apparatus connected to a plurality of regulating valves attached to a fluid circuit which circulates fluid between a plurality of heaters heating the fluid, the plurality of heaters having a property that heating capacity varies according to flow quantity of the fluid and a COP (coefficient of performance) varies according to the heating capacity, and at least one of a tank storing the fluid and an appliance using the fluid as a heat source, the control apparatus further being connected to a power meter configured to measure power of each of the plurality of heaters and an outdoor air temperature sensor configured to measure an outdoor air temperature, the control apparatus comprising:
    a determining part configured to determine the heating capacity of each of the plurality of heaters so that total heating capacity of the plurality of heaters reaches a required heating capacity, and so that a total COP of the plurality of heaters satisfies a predetermined condition,
    the determining part, based on the determined heating capacity, the power consumption measured by the power meter, and the outdoor air temperature measured by the outdoor air temperature sensor, obtaining a relation between the COP and the heating capacity of each of the plurality of heaters according to the outdoor air temperature, and determining the heating capacity of each of the plurality of heaters by referring to the obtained relation; and
    a controlling part configured to control each of the plurality of regulating valves so that the heating capacity of each of the plurality of heaters reaches the determined heating capacity.

* * * * *